United States Patent [19]

Zelinsky et al.

[11] Patent Number: 4,837,710

[45] Date of Patent: Jun. 6, 1989

[54] EMULATION ATTRIBUTE MAPPING FOR A COLOR VIDEO DISPLAY

[75] Inventors: Jerold M. Zelinsky, Malden, Mass.; John P. Stafford, Nashua, N.H.; Gerald A. Lief, Newton, Mass.

[73] Assignee: Bull HN Information Systems Inc., Billerica, Mass.

[21] Appl. No.: 806,988

[22] Filed: Dec. 6, 1985

[51] Int. Cl.[4] .................... G06F 15/40

[52] U.S. Cl. .................... 364/521; 340/703; 382/81; 382/82

[58] Field of Search .................... 364/521, 518; 358/81, 358/82; 340/701, 703, 704, 720, 798, 799

[56] References Cited

U.S. PATENT DOCUMENTS

| | | | |
|---|---|---|---|
| 4,149,185 | 4/1979 | Winger | 358/81 |
| 4,408,200 | 10/1983 | Bradley | 340/747 |
| 4,451,824 | 5/1984 | Theyer et al. | 340/720 |
| 4,549,172 | 10/1985 | Welk | 358/81 |
| 4,606,625 | 8/1986 | Geshwind | 352/38 |
| 4,673,929 | 6/1987 | Nelson et al. | 340/703 |
| 4,709,230 | 11/1987 | Popowski et al. | 340/703 |
| 4,720,803 | 1/1988 | Ishii | 364/521 |
| 4,724,431 | 2/1988 | Holtey et al. | 340/703 |
| 4,734,619 | 3/1988 | Havel | 313/510 |
| 4,736,310 | 4/1988 | Colthorpe et al. | 364/526 |
| 4,737,772 | 4/1988 | Nishi et al. | 340/703 |
| 4,739,313 | 4/1988 | Oudshoorn et al. | 340/703 |
| 4,751,446 | 6/1988 | Pineda et al. | 340/703 |
| 4,752,893 | 6/1988 | Guttag et al. | 364/518 |
| 4,754,488 | 6/1988 | Lyke | 382/22 |
| 4,763,283 | 8/1988 | Coutrot | 364/526 |

OTHER PUBLICATIONS

Millman et al. "Pulse, Digital, and Switching Waveforms", McGraw-Hill Book Company-1965, pp. 306-312.

*Primary Examiner*—Gary V. Harkcom
*Assistant Examiner*—Phu K. Nguyen
*Attorney, Agent, or Firm*—Gerald J. Cechony; John S. Solakian; Lewis P. Elbinger

[57] ABSTRACT

A host computer stores data and attribute bytes for display on a terminal or personal computer having a monochrome screen. The monochrome attributes include low intensity, underline, inverse, blink and hide. The host computer may communicate with a terminal or personal computer having a color screen without modifying the host program or the data and attribute bytes. The terminal or personal computer operator may determine the color and attribute for each of the monochrome attributes.

16 Claims, 16 Drawing Sheets

| MONOCHROME ATTRIBUTES | COLOR DISPLAY ATTRIBUTES | | | | | | |
|---|---|---|---|---|---|---|---|
| LOW | BLUE | **GREEN** | CYAN | RED | MAGENTA | YELLOW | WHITE |
| | NORMAL | **LOW** | INVERSE | BLINK | HIDE | | |
| UNDERLINE | BLUE | GREEN | **CYAN** | RED | MAGENTA | YELLOW | WHITE |
| | **NORMAL** | LOW | INVERSE | BLINK | HIDE | | |
| INVERSE | BLUE | GREEN | CYAN | **RED** | MAGENTA | YELLOW | WHITE |
| | NORMAL | LOW | **INVERSE** | BLINK | HIDE | | |
| BLINK | BLUE | GREEN | CYAN | RED | **MAGENTA** | YELLOW | WHITE |
| | NORMAL | LOW | INVERSE | **BLINK** | HIDE | | |
| HIDE | BLUE | GREEN | CYAN | RED | MAGENTA | **YELLOW** | WHITE |
| | NORMAL | LOW | INVERSE | BLINK | **HIDE** | | |
| TEXT | **BLUE** | GREEN | CYAN | RED | MAGENTA | YELLOW | WHITE |
| STATUS | BLUE | GREEN | CYAN | RED | MAGENTA | **YELLOW** | WHITE |
| ERROR | BLUE | GREEN | CYAN | **RED** | MAGENTA | YELLOW | WHITE |

FIG. 3

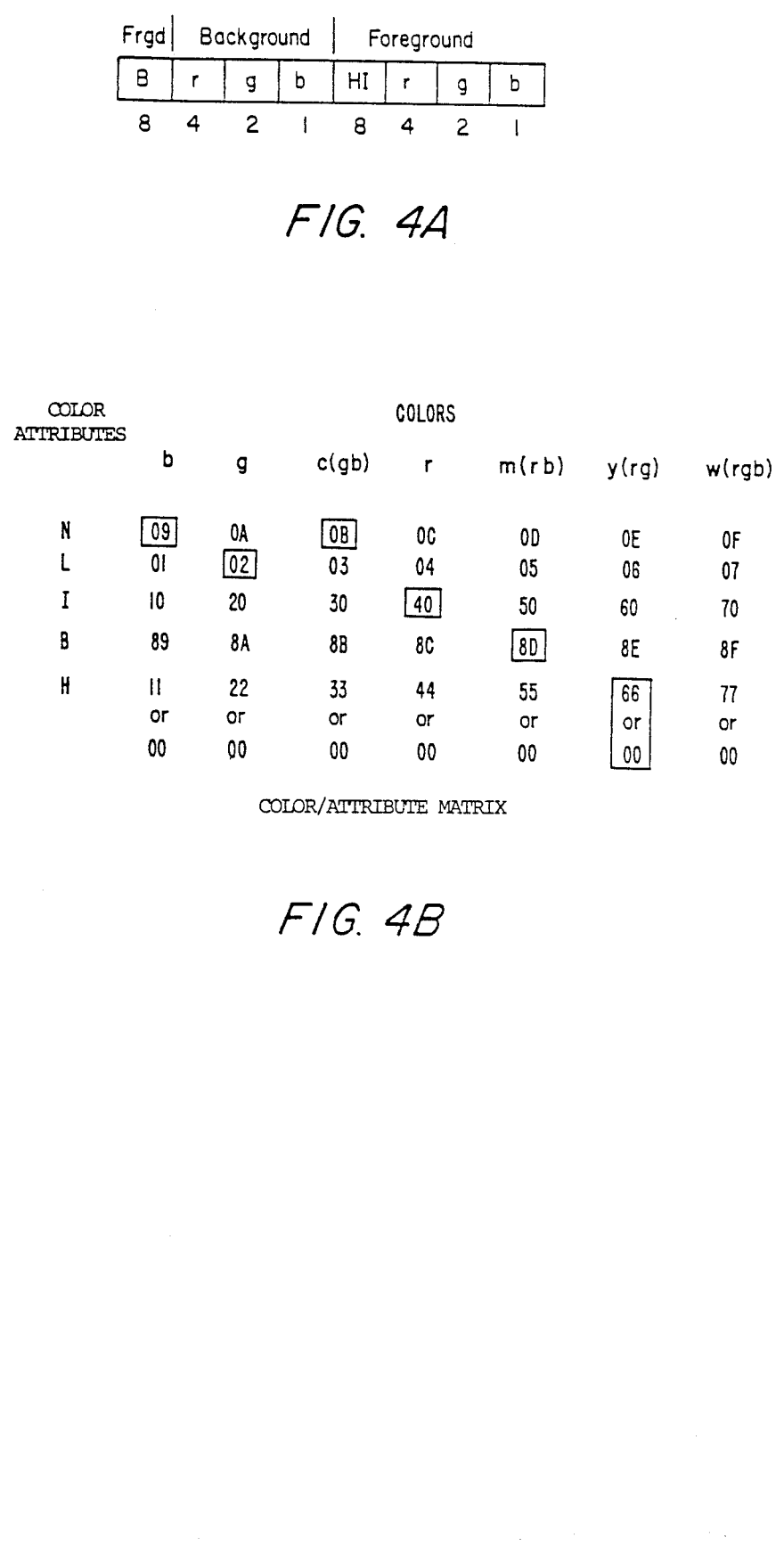

| Frgd | Background | | | Foreground | | | |
|---|---|---|---|---|---|---|---|
| B | r | g | b | HI | r | g | b |
| 8 | 4 | 2 | 1 | 8 | 4 | 2 | 1 |

*FIG. 4A*

| COLOR ATTRIBUTES | COLORS | | | | | | |
|---|---|---|---|---|---|---|---|
| | b | g | c(gb) | r | m(rb) | y(rg) | w(rgb) |
| N | 09 | 0A | 0B | 0C | 0D | 0E | 0F |
| L | 01 | 02 | 03 | 04 | 05 | 06 | 07 |
| I | 10 | 20 | 30 | 40 | 50 | 60 | 70 |
| B | 89 | 8A | 8B | 8C | 8D | 8E | 8F |
| H | 11 or 00 | 22 or 00 | 33 or 00 | 44 or 00 | 55 or 00 | 66 or 00 | 77 or 00 |

COLOR/ATTRIBUTE MATRIX

*FIG. 4B*

PASS_Ø_-_TEXT

| MONOCHROME ATTRIBUTE | | COLOR DISPLAY ATTRIBUTE (BINARY) | | (HEX) |
|---|---|---|---|---|
| 5 U | I H B L | Fd Bkgd | Frgd | |
| P 5 | P4 P3 P2 P1 | B r g b | HI r g b | |
| 0 0 0 0 | 0 0 0 0 | 0 0 0 0 | 1 0 0 1 | 09 |
| 0 0 0 0 | 0 0 0 1 | 0 0 0 0 | 0 0 0 0 | |
| 0 0 0 0 | 0 0 1 0 | 0 0 0 0 | 0 0 0 0 | |
| 0 0 0 0 | 0 0 1 1 | 0 0 0 0 | 0 0 0 0 | |
| 0 0 0 0 | 0 1 0 0 | 0 0 0 0 | 0 0 0 0 | |
| 0 0 0 0 | 0 1 0 1 | 0 0 0 0 | 0 0 0 0 | |
| 0 0 0 0 | 0 1 1 0 | 0 0 0 0 | 0 0 0 0 | |
| 0 0 0 0 | 0 1 1 1 | 0 0 0 0 | 0 0 0 0 | |
| 0 0 0 0 | 1 0 0 0 | 0 0 0 0 | 0 0 0 0 | |
| 0 0 0 0 | 1 0 0 1 | 0 0 0 0 | 0 0 0 0 | |
| 0 0 0 0 | 1 0 1 0 | 0 0 0 0 | 0 0 0 0 | |
| 0 0 0 0 | 1 0 1 1 | 0 0 0 0 | 0 0 0 0 | |
| 0 0 0 0 | 1 1 0 0 | 0 0 0 0 | 0 0 0 0 | |
| 0 0 0 0 | 1 1 0 1 | 0 0 0 0 | 0 0 0 0 | |
| 0 0 0 0 | 1 1 1 0 | 0 0 0 0 | 0 0 0 0 | |
| 0 0 0 0 | 1 1 1 1 | 0 0 0 0 | 0 0 0 0 | |
| 0 0 0 1 | 0 0 0 0 | 0 0 0 0 | 0 0 0 0 | |
| 0 0 0 1 | 0 0 0 1 | 0 0 0 0 | 0 0 0 0 | |
| 0 0 0 1 | 0 0 1 0 | 0 0 0 0 | 0 0 0 0 | |
| 0 0 0 1 | 0 0 1 1 | 0 0 0 0 | 0 0 0 0 | |
| 0 0 0 1 | 0 1 0 0 | 0 0 0 0 | 0 0 0 0 | |
| 0 0 0 1 | 0 1 0 1 | 0 0 0 0 | 0 0 0 0 | |
| 0 0 0 1 | 0 1 1 0 | 0 0 0 0 | 0 0 0 0 | |
| 0 0 0 1 | 0 1 1 1 | 0 0 0 0 | 0 0 0 0 | |
| 0 0 0 1 | 1 0 0 0 | 0 0 0 0 | 0 0 0 0 | |
| 0 0 0 1 | 1 0 0 1 | 0 0 0 0 | 0 0 0 0 | |
| 0 0 0 1 | 1 0 1 0 | 0 0 0 0 | 0 0 0 0 | |
| 0 0 0 1 | 1 0 1 1 | 0 0 0 0 | 0 0 0 0 | |
| 0 0 0 1 | 1 1 0 0 | 0 0 0 0 | 0 0 0 0 | |
| 0 0 0 1 | 1 1 0 1 | 0 0 0 0 | 0 0 0 0 | |
| 0 0 0 1 | 1 1 1 0 | 0 0 0 0 | 0 0 0 0 | |
| 0 0 0 1 | 1 1 1 1 | 0 0 0 0 | 0 0 0 0 | |

FIG. 5A

PASS 1 - LOW

| MONOCHROME ATTRIBUTE | | COLOR DISPLAY ATTRIBUTE (BINARY) | | (HEX) |
|---|---|---|---|---|
| 5 — U P 5 | I H B L P P P P 4 3 2 1 | Fd Bkgd B r g b | Frgd HI r g b | |
| 0 0 0 0 | 0 0 0 0 | 0 0 0 0 | 1 0 0 1 | |
| 0 0 0 0 | 0 0 0 1 | 0 0 0 0 | 0 0 1 0 | 02 |
| 0 0 0 0 | 0 0 1 0 | 0 0 0 0 | 0 0 0 0 | |
| 0 0 0 0 | 0 0 1 1 | 0 0 0 0 | 0 0 1 0 | 02 |
| 0 0 0 0 | 0 1 0 0 | 0 0 0 0 | 0 0 0 0 | |
| 0 0 0 0 | 0 1 0 1 | 0 0 0 0 | 0 0 1 0 | 02 |
| 0 0 0 0 | 0 1 1 0 | 0 0 0 0 | 0 0 0 0 | |
| 0 0 0 0 | 0 1 1 1 | 0 0 0 0 | 0 0 1 0 | 02 |
| 0 0 0 0 | 1 0 0 0 | 0 0 0 0 | 0 0 0 0 | |
| 0 0 0 0 | 1 0 0 1 | 0 0 0 0 | 0 0 1 0 | 02 |
| 0 0 0 0 | 1 0 1 0 | 0 0 0 0 | 0 0 0 0 | |
| 0 0 0 0 | 1 0 1 1 | 0 0 0 0 | 0 0 1 0 | 02 |
| 0 0 0 0 | 1 1 0 0 | 0 0 0 0 | 0 0 0 0 | |
| 0 0 0 0 | 1 1 0 1 | 0 0 0 0 | 0 0 1 0 | 02 |
| 0 0 0 0 | 1 1 1 0 | 0 0 0 0 | 0 0 0 0 | |
| 0 0 0 0 | 1 1 1 1 | 0 0 0 0 | 0 0 1 0 | 02 |
| 0 0 0 1 | 0 0 0 0 | 0 0 0 0 | 0 0 0 0 | |
| 0 0 0 1 | 0 0 0 1 | 0 0 0 0 | 0 0 1 0 | 02 |
| 0 0 0 1 | 0 0 1 0 | 0 0 0 0 | 0 0 0 0 | |
| 0 0 0 1 | 0 0 1 1 | 0 0 0 0 | 0 0 1 0 | 02 |
| 0 0 0 1 | 0 1 0 0 | 0 0 0 0 | 0 0 0 0 | |
| 0 0 0 1 | 0 1 0 1 | 0 0 0 0 | 0 0 1 0 | 02 |
| 0 0 0 1 | 0 1 1 0 | 0 0 0 0 | 0 0 0 0 | |
| 0 0 0 1 | 0 1 1 1 | 0 0 0 0 | 0 0 1 0 | 02 |
| 0 0 0 1 | 1 0 0 0 | 0 0 0 0 | 0 0 0 0 | |
| 0 0 0 1 | 1 0 0 1 | 0 0 0 0 | 0 0 1 0 | 02 |
| 0 0 0 1 | 1 0 1 0 | 0 0 0 0 | 0 0 0 0 | |
| 0 0 0 1 | 1 0 1 1 | 0 0 0 0 | 0 0 1 0 | 02 |
| 0 0 0 1 | 1 1 0 0 | 0 0 0 0 | 0 0 0 0 | |
| 0 0 0 1 | 1 1 0 1 | 0 0 0 0 | 0 0 1 0 | 02 |
| 0 0 0 1 | 1 1 1 0 | 0 0 0 0 | 0 0 0 0 | |
| 0 0 0 1 | 1 1 1 1 | 0 0 0 0 | 0 0 1 0 | 02 |

FIG. 5B

PASS_2 - UNDERLINE

| MONOCHROME ATTRIBUTE | | COLOR DISPLAY ATTRIBUTE (BINARY) | | (HEX) |
|---|---|---|---|---|
| 5 U P 5 | I H B L P P P P 4 3 2 1 | Fd Bkgd B r g b | Frgd HI r g b | |
| 0 0 0 0 | 0 0 0 0 | 0 0 0 0 | 1 0 0 1 | |
| 0 0 0 0 | 0 0 0 1 | 0 0 0 0 | 0 0 1 0 | |
| 0 0 0 0 | 0 0 1 0 | 0 0 0 0 | 0 0 0 0 | |
| 0 0 0 0 | 0 0 1 1 | 0 0 0 0 | 0 0 1 0 | |
| 0 0 0 0 | 0 1 0 0 | 0 0 0 0 | 0 0 0 0 | |
| 0 0 0 0 | 0 1 0 1 | 0 0 0 0 | 0 0 1 0 | |
| 0 0 0 0 | 0 1 1 0 | 0 0 0 0 | 0 0 0 0 | |
| 0 0 0 0 | 0 1 1 1 | 0 0 0 0 | 0 0 1 0 | |
| 0 0 0 0 | 1 0 0 0 | 0 0 0 0 | 0 0 0 0 | |
| 0 0 0 0 | 1 0 0 1 | 0 0 0 0 | 0 0 1 0 | |
| 0 0 0 0 | 1 0 1 0 | 0 0 0 0 | 0 0 0 0 | |
| 0 0 0 0 | 1 0 1 1 | 0 0 0 0 | 0 0 1 0 | |
| 0 0 0 0 | 1 1 0 0 | 0 0 0 0 | 0 0 0 0 | |
| 0 0 0 0 | 1 1 0 1 | 0 0 0 0 | 0 0 1 0 | |
| 0 0 0 0 | 1 1 1 0 | 0 0 0 0 | 0 0 0 0 | |
| 0 0 0 0 | 1 1 1 1 | 0 0 0 0 | 0 0 1 0 | |
| 0 0 0 1 | 0 0 0 0 | 0 0 0 0 | 1 0 1 1 | OB |
| 0 0 0 1 | 0 0 0 1 | 0 0 0 0 | 1 0 1 1 | OB |
| 0 0 0 1 | 0 0 1 0 | 0 0 0 0 | 1 0 1 1 | OB |
| 0 0 0 1 | 0 0 1 1 | 0 0 0 0 | 1 0 1 1 | OB |
| 0 0 0 1 | 0 1 0 0 | 0 0 0 0 | 1 0 1 1 | OB |
| 0 0 0 1 | 0 1 0 1 | 0 0 0 0 | 1 0 1 1 | OB |
| 0 0 0 1 | 0 1 1 0 | 0 0 0 0 | 1 0 1 1 | OB |
| 0 0 0 1 | 0 1 1 1 | 0 0 0 0 | 1 0 1 1 | OB |
| 0 0 0 1 | 1 0 0 0 | 0 0 0 0 | 1 0 1 1 | OB |
| 0 0 0 1 | 1 0 0 1 | 0 0 0 0 | 1 0 1 1 | OB |
| 0 0 0 1 | 1 0 1 0 | 0 0 0 0 | 1 0 1 1 | OB |
| 0 0 0 1 | 1 0 1 1 | 0 0 0 0 | 1 0 1 1 | OB |
| 0 0 0 1 | 1 1 0 0 | 0 0 0 0 | 1 0 1 1 | OB |
| 0 0 0 1 | 1 1 0 1 | 0 0 0 0 | 1 0 1 1 | OB |
| 0 0 0 1 | 1 1 1 0 | 0 0 0 0 | 1 0 1 1 | OB |
| 0 0 0 1 | 1 1 1 1 | 0 0 0 0 | 1 0 1 1 | OB |

FIG. 5C

PASS 3 - INVERSE

| MONOCHROME ATTRIBUTE | | COLOR DISPLAY ATTRIBUTE (BINARY) | | (HEX) |
|---|---|---|---|---|
| U | I H B L | Fd Bkgd | Frgd | |
| P 5 | P P P P 4 3 2 1 | B r g b | HI r g b | |
| 0 0 0 0 | 0 0 0 0 | 0 0 0 0 | 1 0 0 1 | |
| 0 0 0 0 | 0 0 0 1 | 0 0 0 0 | 0 0 1 0 | |
| 0 0 0 0 | 0 0 1 0 | 0 0 0 0 | 0 0 0 0 | |
| 0 0 0 0 | 0 0 1 1 | 0 0 0 0 | 0 0 1 0 | |
| 0 0 0 0 | 0 1 0 0 | 0 0 0 0 | 0 0 0 0 | |
| 0 0 0 0 | 0 1 0 1 | 0 0 0 0 | 0 0 1 0 | |
| 0 0 0 0 | 0 1 1 0 | 0 0 0 0 | 0 0 0 0 | |
| 0 0 0 0 | 0 1 1 1 | 0 0 0 0 | 0 0 1 0 | |
| 0 0 0 0 | 1 0 0 0 | 0 1 0 0 | 0 0 0 0 | 40 |
| 0 0 0 0 | 1 0 0 1 | 0 1 0 0 | 0 0 0 0 | 40 |
| 0 0 0 0 | 1 0 1 0 | 0 1 0 0 | 0 0 0 0 | 40 |
| 0 0 0 0 | 1 0 1 1 | 0 1 0 0 | 0 0 0 0 | 40 |
| 0 0 0 0 | 1 1 0 0 | 0 1 0 0 | 0 0 0 0 | 40 |
| 0 0 0 0 | 1 1 0 1 | 0 1 0 0 | 0 0 0 0 | 40 |
| 0 0 0 0 | 1 1 1 0 | 0 1 0 0 | 0 0 0 0 | 40 |
| 0 0 0 0 | 1 1 1 1 | 0 1 0 0 | 0 0 0 0 | 40 |
| 0 0 0 1 | 0 0 0 0 | 0 0 0 0 | 1 0 1 1 | |
| 0 0 0 1 | 0 0 0 1 | 0 0 0 0 | 1 0 1 1 | |
| 0 0 0 1 | 0 0 1 0 | 0 0 0 0 | 1 0 1 1 | |
| 0 0 0 1 | 0 0 1 1 | 0 0 0 0 | 1 0 1 1 | |
| 0 0 0 1 | 0 1 0 0 | 0 0 0 0 | 1 0 1 1 | |
| 0 0 0 1 | 0 1 0 1 | 0 0 0 0 | 1 0 1 1 | |
| 0 0 0 1 | 0 1 1 0 | 0 0 0 0 | 1 0 1 1 | |
| 0 0 0 1 | 0 1 1 1 | 0 0 0 0 | 1 0 1 1 | |
| 0 0 0 1 | 1 0 0 0 | 0 1 0 0 | 0 0 0 0 | 40 |
| 0 0 0 1 | 1 0 0 1 | 0 1 0 0 | 0 0 0 0 | 40 |
| 0 0 0 1 | 1 0 1 0 | 0 1 0 0 | 0 0 0 0 | 40 |
| 0 0 0 1 | 1 0 1 1 | 0 1 0 0 | 0 0 0 0 | 40 |
| 0 0 0 1 | 1 1 0 0 | 0 1 0 0 | 0 0 0 0 | 40 |
| 0 0 0 1 | 1 1 0 1 | 0 1 0 0 | 0 0 0 0 | 40 |
| 0 0 0 1 | 1 1 1 0 | 0 1 0 0 | 0 0 0 0 | 40 |
| 0 0 0 1 | 1 1 1 1 | 0 1 0 0 | 0 0 0 0 | 40 |

5

FIG. 5D

PASS 4 - BLINK

5

| MONOCHROME ATTRIBUTE U / P5 | I H B L / P4 P3 P2 P1 | COLOR DISPLAY ATTRIBUTE (BINARY) Fd Bkgd B r g b | Frgd HI r g b | (HEX) |
|---|---|---|---|---|
| 0 0 0 0 | 0 0 0 0 | 0 0 0 0 | 1 0 0 1 | |
| 0 0 0 0 | 0 0 0 1 | 0 0 0 0 | 0 0 1 0 | |
| 0 0 0 0 | 0 0 1 0 | 1 0 0 0 | 1 1 0 1 | 8D |
| 0 0 0 0 | 0 0 1 1 | 1 0 0 0 | 1 1 0 1 | 8D |
| 0 0 0 0 | 0 1 0 0 | 0 0 0 0 | 0 0 0 0 | |
| 0 0 0 0 | 0 1 0 1 | 0 0 0 0 | 0 0 1 0 | |
| 0 0 0 0 | 0 1 1 0 | 1 0 0 0 | 1 1 0 1 | 8D |
| 0 0 0 0 | 0 1 1 1 | 1 0 0 0 | 1 1 0 1 | 8D |
| 0 0 0 0 | 1 0 0 0 | 0 1 0 0 | 0 0 0 0 | |
| 0 0 0 0 | 1 0 0 1 | 0 1 0 0 | 0 0 0 0 | |
| 0 0 0 0 | 1 0 1 0 | 1 0 0 0 | 1 1 0 1 | 8D |
| 0 0 0 0 | 1 0 1 1 | 1 0 0 0 | 1 1 0 1 | 8D |
| 0 0 0 0 | 1 1 0 0 | 0 1 0 0 | 0 0 0 0 | |
| 0 0 0 0 | 1 1 0 1 | 0 1 0 0 | 0 0 0 0 | |
| 0 0 0 0 | 1 1 1 0 | 1 0 0 0 | 1 1 0 1 | 8D |
| 0 0 0 0 | 1 1 1 1 | 1 0 0 0 | 1 1 0 1 | 8D |
| 0 0 0 1 | 0 0 0 0 | 0 0 0 0 | 1 0 1 1 | |
| 0 0 0 1 | 0 0 0 1 | 0 0 0 0 | 1 0 1 1 | |
| 0 0 0 1 | 0 0 1 0 | 1 0 0 0 | 1 1 0 1 | 8D |
| 0 0 0 1 | 0 0 1 1 | 1 0 0 0 | 1 1 0 1 | 8D |
| 0 0 0 1 | 0 1 0 0 | 0 0 0 0 | 1 0 1 1 | |
| 0 0 0 1 | 0 1 0 1 | 0 0 0 0 | 1 0 1 1 | |
| 0 0 0 1 | 0 1 1 0 | 1 0 0 0 | 1 1 0 1 | 8D |
| 0 0 0 1 | 0 1 1 1 | 1 0 0 0 | 1 1 0 1 | 8D |
| 0 0 0 1 | 1 0 0 0 | 0 1 0 0 | 0 0 0 0 | |
| 0 0 0 1 | 1 0 0 1 | 0 1 0 0 | 0 0 0 0 | |
| 0 0 0 1 | 1 0 1 0 | 1 0 0 0 | 1 1 0 1 | 8D |
| 0 0 0 1 | 1 0 1 1 | 1 0 0 0 | 1 1 0 1 | 8D |
| 0 0 0 1 | 1 1 0 0 | 0 1 0 0 | 0 0 0 0 | |
| 0 0 0 1 | 1 1 0 1 | 0 1 0 0 | 0 0 0 0 | |
| 0 0 0 1 | 1 1 1 0 | 1 0 0 0 | 1 1 0 1 | 8D |
| 0 0 0 1 | 1 1 1 1 | 1 0 0 0 | 1 1 0 1 | 8D |

FIG. 5E

PASS 5 - HIDE

| MONOCHROME ATTRIBUTE (U / P5) | MONOCHROME ATTRIBUTE (I H B L / P4 P3 P2 P1) | | COLOR DISPLAY ATTRIBUTE (BINARY) Fd Bkgd B r g b | Frgd HI r g b | (HEX) |
|---|---|---|---|---|---|
| 0 0 0 0 | 0 0 0 0 | | 0 0 0 0 | 1 0 0 1 | 09 |
| 0 0 0 0 | 0 0 0 1 | A | 0 0 0 0 | 0 0 1 0 | 02 |
| 0 0 0 0 | 0 0 1 0 | D | 1 0 0 0 | 1 1 0 1 | 8D |
| 0 0 0 0 | 0 0 1 1 | | 1 0 0 0 | 1 1 0 1 | 8D |
| 0 0 0 0 | 0 1 0 0 | E | 0 0 0 0 | 0 0 0 0 | 00 |
| 0 0 0 0 | 0 1 0 1 | | 0 0 0 0 | 0 0 0 0 | 00 |
| 0 0 0 0 | 0 1 1 0 | | 0 0 0 0 | 0 0 0 0 | 00 |
| 0 0 0 0 | 0 1 1 1 | | 0 0 0 0 | 0 0 0 0 | 00 |
| 0 0 0 0 | 1 0 0 0 | C | 0 1 0 0 | 0 0 0 0 | 40 |
| 0 0 0 0 | 1 0 0 1 | | 0 1 0 0 | 0 0 0 0 | 40 |
| 0 0 0 0 | 1 0 1 0 | | 1 0 0 0 | 1 1 0 1 | 8D |
| 0 0 0 0 | 1 0 1 1 | | 1 0 0 0 | 1 1 0 1 | 8D |
| 0 0 0 0 | 1 1 0 0 | | 0 1 1 0 | 0 1 1 0 | 66 |
| 0 0 0 0 | 1 1 0 1 | | 0 1 1 0 | 0 1 1 0 | 66 |
| 0 0 0 0 | 1 1 1 0 | | 0 1 1 0 | 0 1 1 0 | 66 |
| 0 0 0 0 | 1 1 1 1 | | 0 1 1 0 | 0 1 1 0 | 66 |
| 0 0 0 1 | 0 0 0 0 | B | 0 0 0 0 | 1 0 1 1 | OB |
| 0 0 0 1 | 0 0 0 1 | | 0 0 0 0 | 1 0 1 1 | OB |
| 0 0 0 1 | 0 0 1 0 | F | 1 0 0 0 | 1 1 0 1 | 8D |
| 0 0 0 1 | 0 0 1 1 | | 1 0 0 0 | 1 1 0 1 | 8D |
| 0 0 0 1 | 0 1 0 0 | | 0 0 0 0 | 0 0 0 0 | 00 |
| 0 0 0 1 | 0 1 0 1 | | 0 0 0 0 | 0 0 0 0 | 00 |
| 0 0 0 1 | 0 1 1 0 | | 0 0 0 0 | 0 0 0 0 | 00 |
| 0 0 0 1 | 0 1 1 1 | | 0 0 0 0 | 0 0 0 0 | 00 |
| 0 0 0 1 | 1 0 0 0 | | 0 1 0 0 | 0 0 0 0 | 40 |
| 0 0 0 1 | 1 0 0 1 | | 0 1 0 0 | 0 0 0 0 | 40 |
| 0 0 0 1 | 1 0 1 0 | | 1 0 0 0 | 1 1 0 1 | 8D |
| 0 0 0 1 | 1 0 1 1 | | 1 0 0 0 | 1 1 0 1 | 8D |
| 0 0 0 1 | 1 1 0 0 | | 0 1 1 0 | 0 1 1 0 | 66 |
| 0 0 0 1 | 1 1 0 1 | | 0 1 1 0 | 0 1 1 0 | 66 |
| 0 0 0 1 | 1 1 1 0 | | 0 1 1 0 | 0 1 1 0 | 66 |
| 0 0 0 1 | 1 1 1 1 | | 0 1 1 0 | 0 1 1 0 | 66 |

(Reference numeral 5 points to the boxed P5 P4 P3 P2 P1 header.)

FIG. 5F

EMULATION ATTRIBUTE MAPPING FOR A COLOR VIDEO DISPLAY

BACKGROUND OF THE INVENTION

1. Field of the Invention

This invention relates generally to the field of computer generated video displays, and relates more particularly to the generation of a color display on a terminal or personal computer while using the existing computer software designed for a monochrome display.

2. Description of the Prior Art

A data terminal or personal computer coupled to a host processor may include a monochrome cathode ray tube for displaying text. Individual characters, words, lines or areas of the displayed text may be highlighted in several ways through the use of attribute characters. Attribute characters may be used to have certain characters or words displayed with special visual attributes such as low intensity. Therefore, an attribute character with a low intensity bit is read out of a video random access memory (RAM) on the same access that the text character is read out of the RAM.

Similarly, other attribute bits are used to underline characters or words, show the characters or words in inverse video, have certain characters or words blink or have certain characters or words not be displayed. If the host computer is coupled to a data terminal or personal computer having a color CRT display, it is desirable to display the attribute features as well as the text in selected colors. Since the host computer is programmed to display in the monochrome mode, the host computer must be reprogrammed to display color. Also, the host computer processes many applications programs, converting each monochrome applications program to display in color is time consuming and therefore expensive.

The selection of color for text, status and error information was previously designed into a Honeywell PC 7800 Emulator.

OBJECTS OF THE INVENTION

Accordingly it is an object of the present invention to provide an improved system wherein a host computer programmed to display text in monochrome will display the text in color on a terminal or personal computer color video display.

It is another object of the invention to provide an improved system having an emulator for processing host computer display software written to display data on a monochrome display, for displaying data in color on a terminal and personal computer having a color video display.

It is yet another object of the invention to use the monochrome attributes associated with the text characters to highlight text characters and words in color.

It is still another object of the invention whereby monochrome attributes are assigned by an operator to assign a color and a color attribute for each monochrome attribute.

It is yet another object of the invention to generate a translation table wherein monochrome attributes select predetermined color attributes to control a color video display.

SUMMARY OF THE INVENTION

A host computer stores data and attribute bytes for display on a terminal or personal computer having a monochrome screen. The monochrome attributes include low intensity, underline, inverse, blink and hide. The host computer may communicate with a terminal or personal computer having a color screen without modifying the host program or the data and attribute bytes.

The terminal or personal computer operator may determine the color and color attribute for each of the monochrome attributes. As an example, the low intensity monochrome attribute received by the terminal or personal computer may result in that field displaying yellow blinking characters on a black background.

The attribute color byte includes bits designating a red, a blue and a green color, or combination of red, green and blue, for both the foreground and background as well as a blink bit and a high intensity bit.

A color/attribute table stores color attribute bytes for each monochrome attribute for seven colors. As an example, the monochrome low intensity byte may select the following colors in low intensity:

Hexadecimal 01 selects blue, hexadecimal 02 selects green, hexadecimal 03 selects cyan (green and blue), hexadecimal 04 selects red, hexadecimal 05 selects magenta (red and blue), hexadecimal 06 selects yellow (red and green), and hexadecimal 07 selects white (red, green and blue).

An attribute translation table is then developed using operator selected values from the color/attribute table.

An attribute translation table is developed one pass at a time. The first monochrome attribute used to develop the translation table has lowest priority. Each monochrome attribute used to develop the attribute translation table has a higher priority than all the previous monochrome attributes, the last monochrome attribute having the highest priority. For example, if a monochrome attribute calls for blinking and low intensity and the blink monochrome attribute was used to develop the translation table after the low intensity monochrome attribute, then the displayed color characters would be the selected blink attribute rather than the selected low intensity color attribute.

During the display of color characters, the monochrome attribute bytes address the translation table to read out the color and intensity of the foreground and background and also whether the character is blinking. The character displayed is in the foreground color unless the inverse monochrome attribute was received.

BRIEF DESCRIPTION OF THE DRAWING

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 3 shows the menu which allows the operator to select the color for text and for each monochrome attribute.

FIG. 4A shows the bit configuration of a color display attribute.

FIG. 4B shows a color/attribute matrix for selecting color attributes.

FIGS. 5A through 5F show the contents of the attribute translation table during its development after each pass of a monochrome attribute; FIG. 5F shows the final translation table.

DESCRIPTION OF THE PREFERRED EMBODIMENT

Figure 1:
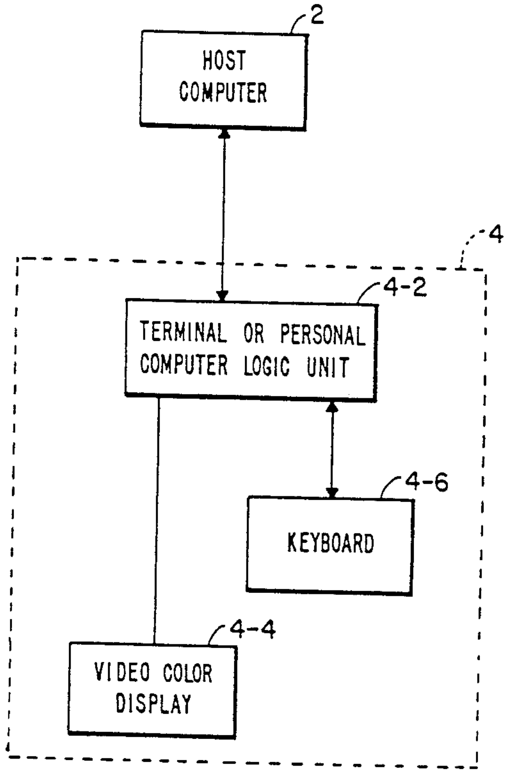
FIG. 1 shows a block diagram of a host computer coupled to a terminal or personal computer, each having a video color display.

FIG. 1 shows a typical system showing a host computer 2 coupled to a remote device 4. The remote device 4 may be a computer terminal or a personal computer. The host computer could be typically a Honeywell Level 6 system. The personal computer may be typically an IBM PC. The remote device 4 includes a logic unit 4-2, a keyboard 4-6 and a color video display 4-4.

Normal operation is for the host computer 2 to send color text data and color attribute characters to the logic unit 4-2 for display on the face of the color video display 4-4. The host computer 2 may receive information from the operator actuated keyboard 4-6 via logic unit 4-2.

The color text data and attributes are stored in two areas of memory in logic unit 4-2. There are three bits for foreground and 3 bits for background of memory store data attributes for display in red, green and blue colors. Other display colors are formed by combining the red, green and blue colors in different combinations. As an example, magenta is selected by storing in both the blue and red bits of memory so that they are superimposed on the color video display 4-4.

In the system where the display was a monochrome display, data and attribute characters were stored in a single area of memory for transfer to a data RAM and an attribute RAM (not shown) in logic unit 4-2. This invention converts the monochrome text data and monochrome attribute characters stored in that single area of memory to selected text colors and color attributes.

Figure 2:
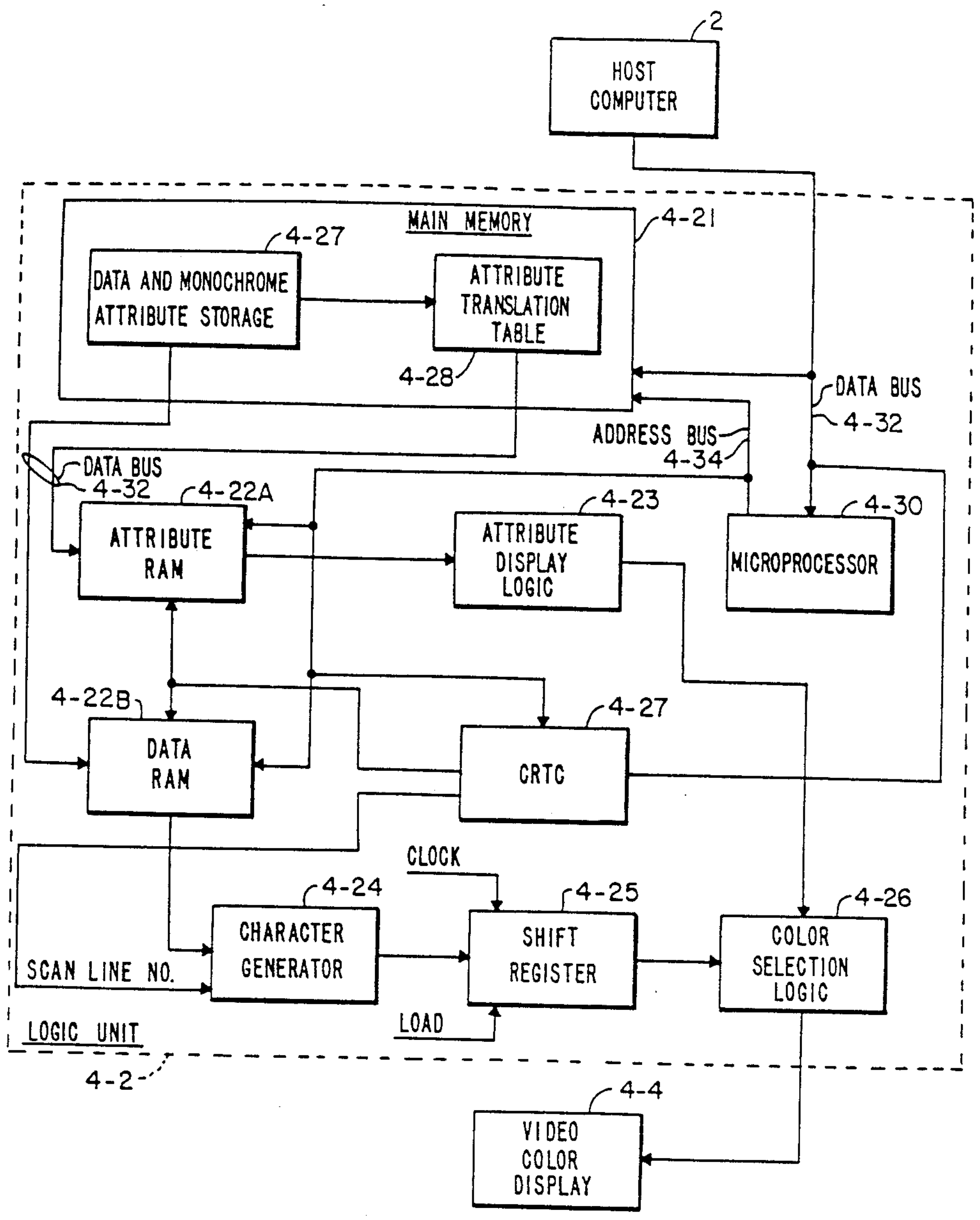
FIG. 2 shows a block diagram of the portion of the terminal or personal computer which receives the monochrome data and attribute bytes and displays the selected color text and attributes.

Referring to FIG. 2, the logic unit 4-2 of remote device 4 includes a data and monochrome attribute storage area 4-27 and an attribute translation table 4-28, both in a main memory 4-21. Monochrome data and monochrome attributes are received from the host computer 2 and stored in the data and monochrome attribute storage 4-27. The monochrome data and monochrome attributes are stored in the same format as if the information is displayed in monochrome. The attribute translation table 4-28 receives the monochrome attributes and translates them to color attributes for display in selected colors.

The data is displayed in the normal fashion by first storing the data bytes in a video random access memory (RAM) 4-22B in the order in which they will be displayed. The data bytes are read out of successive address locations of data RAM 4-22B and applied to the address terminals of a character generator 4-24. Also applied to the address terminals of character generator 4-24 are a number of scan line signals. The character generator stores the bits representative of the pixels displayed in the display 4-4 to display the character. As an example, if each character is displayed using a 7×9 matrix of pixels, then the character generator 4-24 stores that character in 9 bytes, one byte for each of the horizontal raster lines represented by the scan line number signals. As the horizontal raster line to display the first line of characters sweeps across the face of the display 4-4, that scan line of pixels is displayed of each top slice of the character.

A cathode ray tube controller (CRTC) 4-27 provides the successive address signals to the data RAM 4-22B as well as the scan line number signals to character generator 4-24. Each byte from the character generator 4-24 is loaded into a shift register 4-25 under control of a load signal from CRTC 4-27. The load signal keeps the shift register 4-25 in character sync since the CLOCK signal which shifts the bits out of shift register 4-25 is a free running clock.

For this monochrome to color attribute conversion, the monochrome attribute byte received from the host computer 2 includes a low intensity bit, a blink bit, an inverse video bit, an underline bit and a hide bit. This monochrome attribute byte is stored in data and monochrome attribute storage 4-27 and transferred to the attribute translation table 4-28 which generates color attribute bytes.

The color attribute byte includes three foreground color bits, three background color bits, a foreground character intensity bit and a foreground character blinking bit.

The color attribute bytes are stored in an attribute RAM 4-22A in a corresponding location of the first data byte of a field in data RAM 4-22B.

The color attribute byte is read from attribute RAM 4-22A on the same memory cycle that the first data byte of the field is read from data RAM 4-22B and applied to attribute display logic 4-23.

The output signals from attribute display logic 4-23 are applied to color selection logic 4-26. There, the horizontal scan line character bits are combined with the output signals from logic 4-23 to provide the foreground and background colors of the character fields.

Logic unit 4-2 includes a microprocessor 4-30 coupled to main memory 4-21 by a data bus 4-32 and an address bus 4-34. The data and monochrome attribute storage 4-27 is loaded initially from the host computer 2 via data bus 4-32 at memory 4-21 locations specified by microprocessor 4-34 via address bus 4-34. The attribute translation table 4-28 is developed under microprocessor 4-30 control by the Generate Attribute Translation Table 6 software of FIGS. 6A through 6E.

The Attribute Translation Table 4-28 receives monochrome attributes from the data and monochrome storage 4-27 under microprocessor 4-30 control. The selected color attribute is stored in the attribute RAM 4-22A at an address specified by microprocessor 4-30. Also under microprocessor 4-30 control, the text data is read from the data and monochrome attribute storage 4-27 locations in main memory 4-21 and transferred to data RAM 4-22B over data bus 4-32 at locations specified by microprocessor 4-30. Microprocessor 4-30 loads the CRTC 4-27 with control words. The CRTC 4-27 provides successive addresses to the data RAM 4-22B and the attribute RAM 4-22A for display on the video color display 4-4.

The mapping of monochrome attributes is done on a priority scheme, the low intensity monochrome attribute being the lowest priority and the Hide monochrome attribute being the highest. A hide monochrome attribute overrides all attributes previously set;

blink overrides inverse, underline and low; inverse overrides underline and low; and underline overrides low only.

FIG. 3 shows the menu displayed on the videoscreen for assigning monochrome attributes. By means of control keys on the keyboard 4-6, the operator may select one of seven colors for the text, one of seven colors for status information and one of seven colors for error information. In the example shown, text will be displayed in blue, status information in yellow, and error information in red. The cursors for each line of the menu fill in the area between brackets.

In addition, the monochrome attributes may be selected to control color. As shown in FIG. 3, monochrome attributes calling for low intensity are selected by an operator to show up as low intensity green. The operator could have selected any of the other six color variations and any of the other four attributes for display.

Similarly, characters to be underlined would be shown in cyan without being underlined. Characters having inverse monochrome attributes will be shown with a red background and black characters. Note that if the monochrome inverse attribute were mapped as normal, the characters would be red and the background black.

In the order of priorities, text has the lowest priority followed by underline, inverse, blink, and hide which has the highest priority.

Blinking monochrome attributes will be shown in blinking magenta. The hide monochrome attribute gives a black foreground and a black background if the inverse monochrome attribute is not called for by the scheme attribute and gives a yellow foreground and a yellow background if the inverse attribute and the hide attribute are called for by the monochrome attribute.

FIG. 4A shows a screen byte which is selected by the monochrome attribute byte as described infra. The high order bit is the blink (B) bit which operates on the foreground color. The three background bits represent red (r), green (g) and blue (b) respectively. The four foreground bits are high intensity (HI), red (r), green (g) and blue (b).

The two dimensional color/attributes matrix of FIG. 4B gives values in hexadecimal form of the color/attribute combinations. The colors are blue (b), green (g), cyan (gb), red (r), magenta (rb), yellow (rg) and white (rgb).

In FIG. 3, the text selected color is blue. This is shown in the color/attribute matrix of FIG. 4B as hexadecimal 09 (the color attribute byte of FIG. 4A is 0000 1001). Since low intensity is not called for, the high intensity bit is at binary ONE.

The low intensity monochrome attribute calls for green and the low intensity color attribute or hexadecimal 02 (0000 0010). The inverse monochrome attribute calls for red and the inverse color attribute or hexadecimal 40 (0100 0000). The blink monochrome attribute calls for magenta and the blink color attribute or hexadecimal 8D (1000 1101). The underline monochrome attribute may not be available on the color display as in the IBM PC, but can be mapped to additional colors such as cyan normal or hexadecimal 0B. The hide monochrome attribute calls for yellow on yellow hexadecimal 66 (0110 0110) if the inverse monochrome attribute is selected, and black on black hexadecimal 00 if the inverse monochrome attribute is not selected.

FIGS. 5A through 5F show the steps in the development of the attribute translation table 4-28 of FIG. 2. The monochrome attribute headings are underline (U), inverse (I), hide (H), blink (B) and low (L). The color attribute headings, as shown in FIG. 4A, are blink (B), red (r), green (g), blue (b) for the background color and high intensity (HI), red (r), green (g) and blue (b) for the foreground color.

FIG. 5A shows pass 0 indicating the normal text color selection of blue. FIG. 5B shows the results of pass 0 and pass 1. Pass 1 writes over the color attribute background and foreground developed for the low intensity monochrome attribute to the results on pass 0. Similarly, FIG. 5C shows the underline monochrome attribute pass 2 written over the color attribute after pass 1.

FIG. 5D shows the result of the inverse monochrome attribute pass 3 written over the color attribute after pass 2. FIG. 5E shows the result of the blink monochrome attribute pass 4 which is written over pass 3. FIG. 5F shows the completed attribute translation table 4-28 after the hide monochrome attribute pass 5.

The priorities of the monochrome attributes are from top priority to low priority order: hide, blink, inverse, underline and low intensity respectively.

From FIG. 5F, regardless of the binary values of monochrome attributes blink (B), underline (U) and low (L), the hide monochrome attribute with inverse bit (I) at binary ONE has a hexadecimal value of 66, and with the inverse bit (I) at binary ZERO has a hexadecimal value of 00.

Also, the blink (B) monochrome attribute at binary ONE generates a hexadecimal 8D, regardless of the state of the low, inverse or underline monochrome attributes.

The inverse monochrome attribute generates hexadecimal 40, regardless of the state of the underline or low intensity monochrome attributes.

The underline monochrome attribute generates hexadecimal 0B, regardless of the state of the low intensity monochrome attributes.

Note that the priority is established by the monochrome attribute and not the color attributes. For example, if the hide monochrome attribute selects low intensity, then hide displays as low intensity, is not hidden and has top priority.

FIGS. 6A through 6E show the flow diagram for generating the attribute translation table 4-28, which is shown in FIGS. 5A through 5F; the completed attribute translation table 4-28 being shown in FIG. 5F.

Figure 6A:
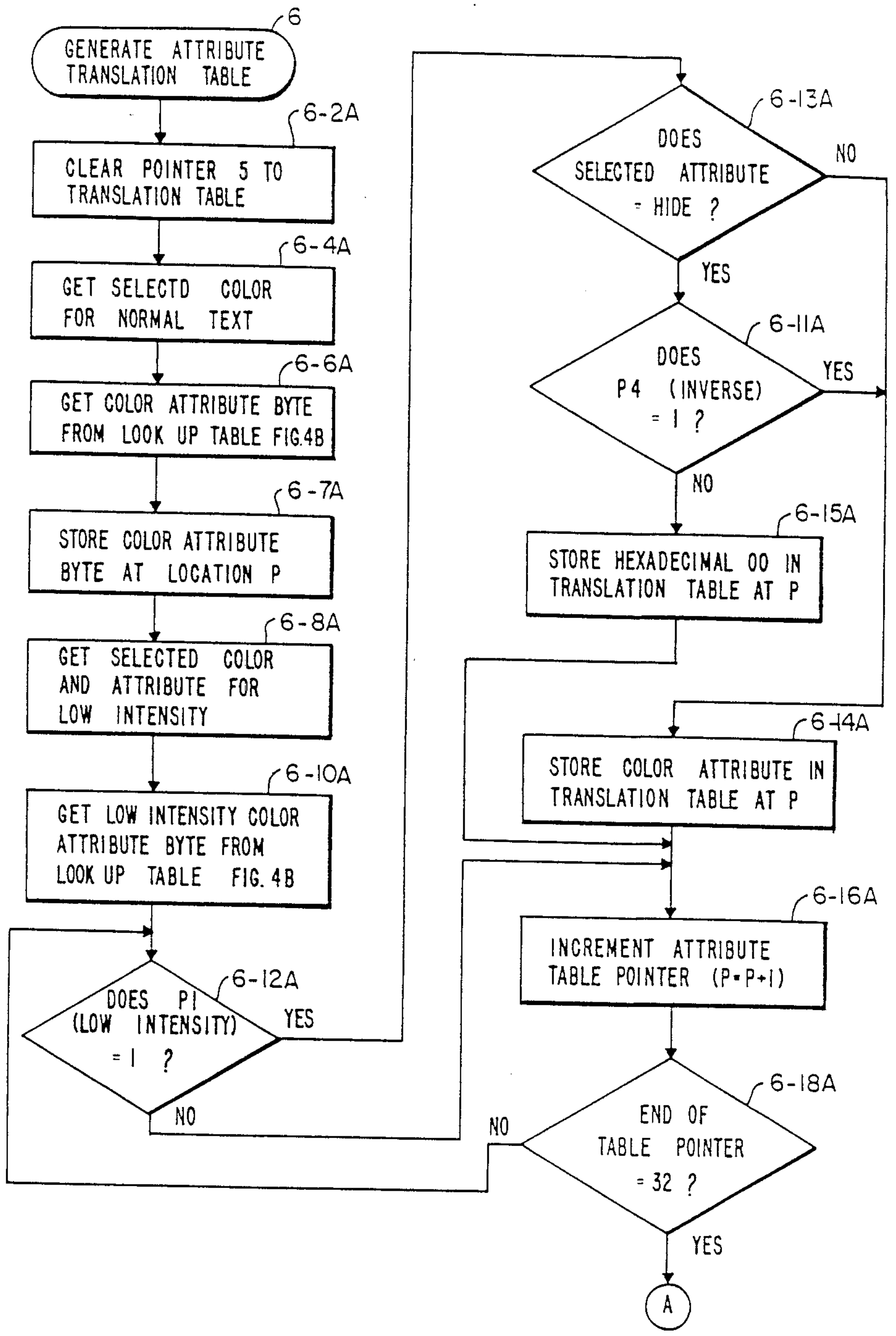
FIGS. 6A through 6E show a flow diagram of the development of the contents of the translation table for each pass of the selected monochrome attribute.

Referring to FIG. 6A, the blocks that make up the Generate Attribute Translation Table 6 include the following.

Block 6-2A clears the contents of a pointer 5 to ZERO. The pointer 5 takes the value of 0000 0000. The pointer 5 includes the following bits: bit Pl corresponds to the monochrome attribute bit L; bit P2 corresponds to the monochrome attribute bit B; bit P3 corresponds to the monochrome attribute bit H; bit P4 corresponds to the monochrome attribute bit I; and bit P5 corresponds to the monochrome attribute bit U.

Block 6-4A gets the selected color for normal text from FIG. 3. The color selected by the operator for text is the color blue. Therefore, the hexadecimal value of 09 is selected from the color/attribute table of FIG. 4B. The binary value of the attribute byte for the text color of blue is 0000 1001. The text color is in the normal mode which results in high intensity. Therefore, the blue foreground bit b and the bit HI are at binary ONE.

Block 6-7A stores the hexadecimal 09 in the location at the address indicated by the contents of the pointer 5 or address 0000 0000. Therefore, the pass 0 table of FIG. 5A would have a screen value of 0000 1001 for a monochrome attribute of 0000 0000. All other monochrome attribute values are initialized since the color attribute values are 0000 0000.

Block 6-8A gets the selected color and color attribute for monochrome attribute low intensity. From FIG. 3, for the low intensity monochrome attribute, the operator selected a low intensity green color, binary 0000 0010 from FIG. 4A, or hexadecimal 02. Block 6-10A gets the color attribute byte hexadecimal 02 from the FIG. 4B color/attribute matrix.

Decision block 6-12A tests P1 corresponding to the low order bit L of the monochrome attribute byte. In this case, P1 equals binary ZERO. Therefore, block 6-16A increments the contents of pointer 5 to 0000 0001. Decision block 6-18A tests the contents of pointer 5 for decimal 32. If the contents of pointer 5 is not equal to 32 indicating that more cycles are required to complete pass 1, then decision block 6-12A again tests the binary bit P1. Since bit P1 is now at binary ONE and the selected attribute is not hide in block 6-13A, then block 6-14A stores the color attribute hexadecimal 02 in the color attribute location addressed by the monochrome attribute 0000 0001.

The translation table after pass 1 will appear as in FIG. 5B as a hexadecimal 09 for monochrome attribute 0000 0000, a hexadecimal 02 for monochrome attribute 0000 0001 and all other odd numbered monochrome attributes. Decision block 6-18A signals the end of pass 1 after the 32nd cycle.

In case the operator selected the low intensity monochrome attribute to have a green color and a hide color attribute, then special handling is required because of the nature of the hide attribute.

The hide color attribute must be processed differently from the other screen attributes because, depending on the state of the inverse monochrome bit (P4), the green hide color attribute appears with a green foreground and background or a black foreground and background. Block 6-10A selected hexadecimal 22 from FIG. 4B indicating green hide and if P1 is at binary ONE in decision block 6-12A, then decision block 6-13A generates a YES output signal. Decision block 6-11A tests the inverse bit P4. If P4 is at binary ONE, then hexadecimal 22 is stored in the screen location at the address specified by pointer 5 by block 6-14A. If P4 is at binary ZERO, then hexadecimal 00 is stored at that address. Hexadecimal 22 gives a green foreground and background and hexadecimal 00 gives a black foreground and background.

Figure 6B:
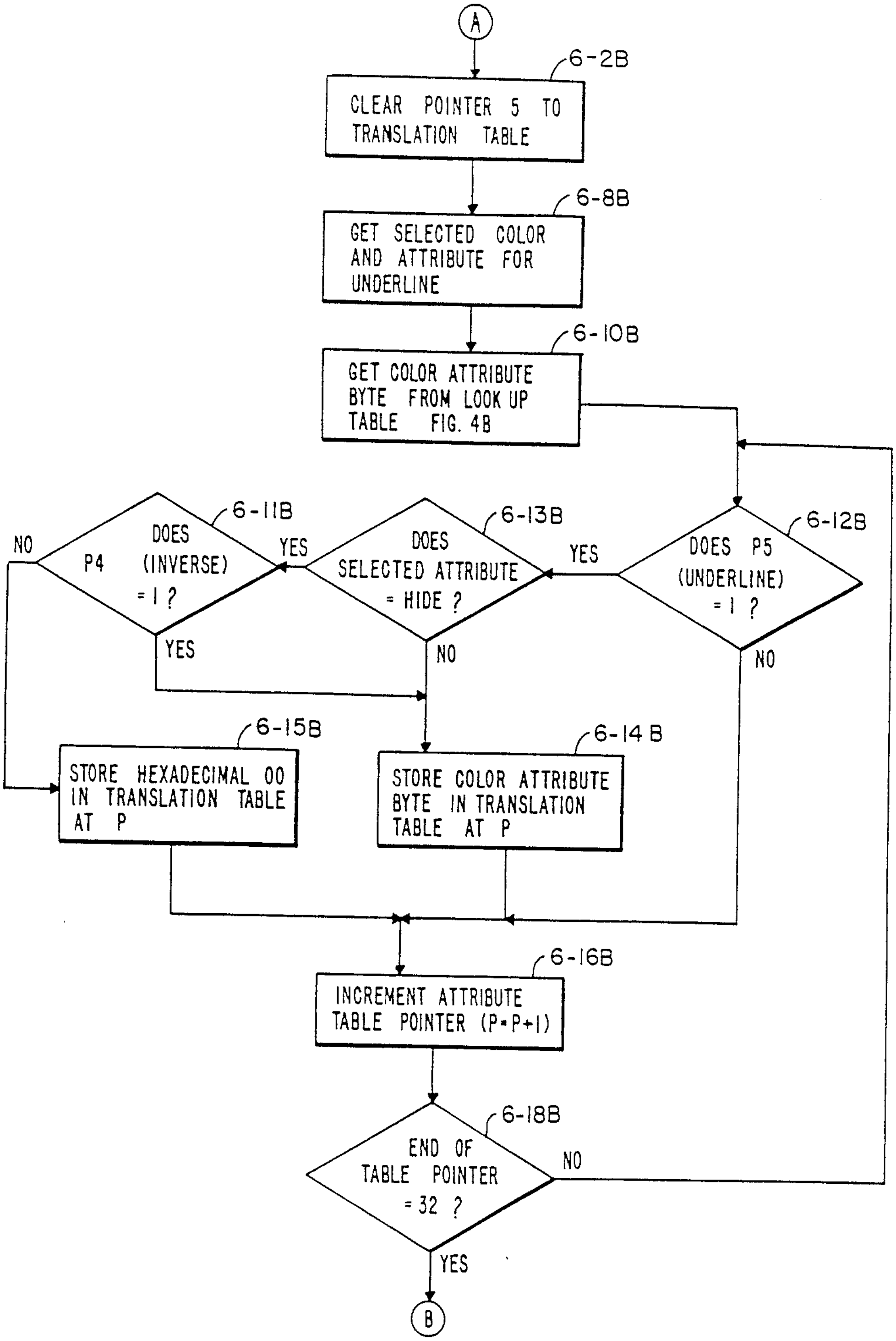

FIG. 5B shows the resulting bits stored in screen after decision block 6-18A indicates 32 cycles and the software branches to block 6-2B of FIG. 6B which clears the pointer 5 to hexadecimal 00 for the start of pass 2.

In the example, the underline monochrome attribute selected cyan and normal in block 6-8B. Cyan is a combination of green and blue. Hexadecimal 0B is selected from the color/attribute table of FIG. 4B in block 6-10B. Decision block 6-12B tests P5 corresponding to the monochrome attribute underline bit I for binary ONE. Note from pass 2 in FIG. 5C that the underline bit appears in monochrome attribute positions 17 through 32. The first 16 positions of pass 2 remain as in pass 1 of FIG. 5B. Block 6-14B will store hexadecimal 0B on each of the 16 cycles of FIG. 6B in the second sixteen positions of the color attribute. Block 6-16B increments pointer 5 after each cycle testing P5. Decision block 6-11B and 6-11B perform in a similar manner to decision blocks 6-11A and 6-13A of FIG. 6A. If cyan and hide were selected for the underline monochrome attribute in FIG. 3, then those monochrome attribute positions having an underline bit (U), a hide color attribute, and an inverse bit (I) would have a color attribute value of hexadecimal 33 which displays a cyan foreground and background. Those monochrome attribute positions having an underline bit (U), a hide color attribute and no inverse bit (I) would have a color attribute value of hexadecimal 00 and display a black foreground and background.

Figure 6C:
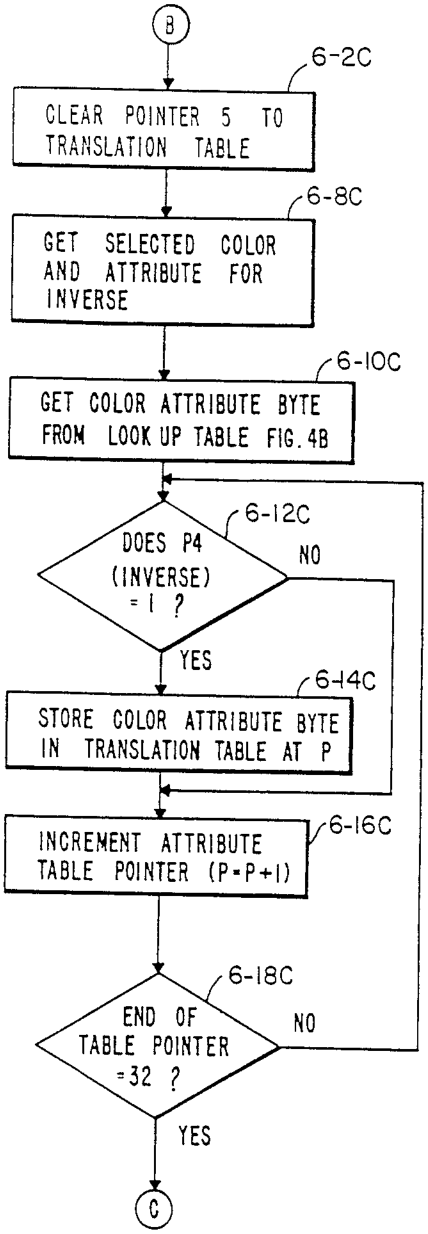

Decision block 6-18B of FIG. 6B branches to block 6-2C of FIG. 6C to clear pointer 5 to hexadecimal 00. From the color attribute table 17 in FIG. 3, the inverse monochrome attribute selected a red color and an inverse color attribute in block 6-8C. Block 6-10C selected hexadecimal 40. Decision block 6-12C tests P4 which corresponds to monochrome attribute inverse bit I. If P4 is at binary ONE, then in block 6-14C, hexadecimal 40 is written into those locations of the color display in pass 3, FIG. 5D. Note that hexadecimal 40 replaced what was previously written in screen positions 9 through 16, and 25 through 32 during the previous passes 0, 1 and 2. This indicates that inverse has a higher priority then the underline or low attributes.

If the P5 bit is not at binary ONE, then block 6-16C increments the contents of pointer 5. Decision block 6-18C counts the number of cycles through the blocks of FIG. 6C and branches to block 6-2D of FIG. 6D after the 32nd cycle.

Block 6-8D got the magenta and blink color attribute which was selected by the blink monochrome attribute as shown in FIG. 3. Block 6-10D got hexadecimal 8D (1000 1101) from the color/attribute table of FIG. 4B. Magenta is a combination of red and blue. Hexadecimal 8D is made up of the blink, high intensity, foreground red and foreground blue bits of FIG. 4A.

Decision block 6-12D tests the P2 bit corresponding to the monochrome attribute bit (B). P5 is at binary ONE, and since the hide color attribute was not selected as determined by decision block 6-13D, then hexadecimal 8D is stored in all color display locations having a monochrome attribute which included the B bit. If P2 is not at binary ONE, the block 6-16D increments the contents of pointer 5.

If the blink monochrome attribute selected magenta and the hide color attribute, then block 6-8D would get magenta and hide and block 6-10D would get hexadecimal 55 from the lookup table.

Decision block 6-12D would test the P2 bit for binary ONE. If the P2 bit is at binary ONE, then decision block 6-13D is tested to determine if the blink monochrome attribute selected the hide color attribute. If yes, then decision block 6-11D tests P4 corresponding to the inverse bit I of the monochrome attribute. If P4 is at binary ONE, then block 6-14D stores hexadecimal 55 as the color display attribute in the appropriate location. If P4 is at binary ZERO, then block 6-15D stores hexadecimal 00 as the color display attribute. Hexadecimal 55 displays a magenta foreground on a magenta background. Hexadecimal 00 displays a black foreground on a black background.

Figure 6D:
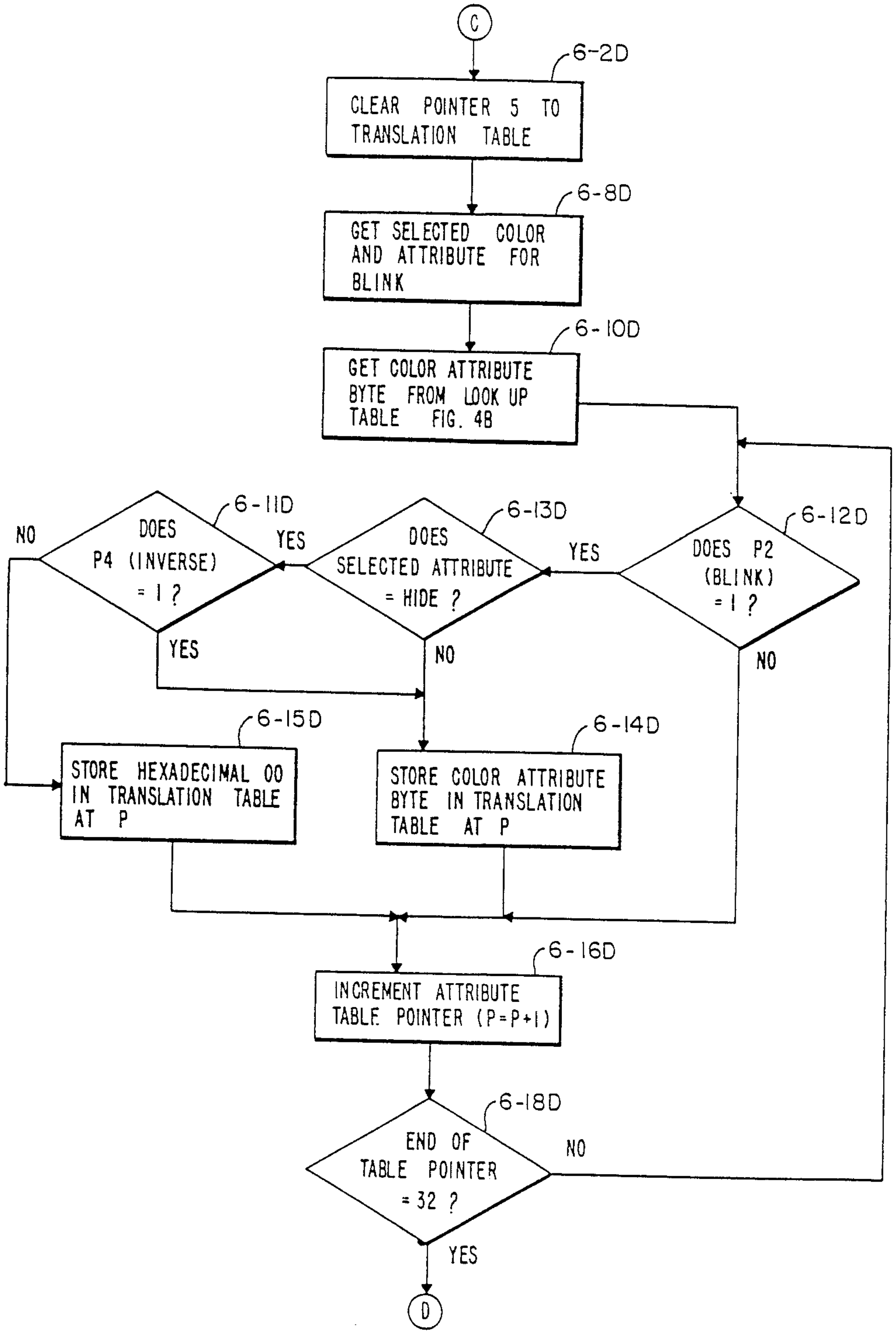

Block 6-16D increments the contents of pointer 5 after each cycle through the blocks of FIG. 6D. Decision block 6-16D tests for the 32nd cycle and branches to block 6-2E of FIG. 6E after pass 4 (FIG. 5E) is completed.

Block 6-2E clears the contents of pointer 5 to hexadecimal 00. Block 6-8E gets yellow and the hide color attribute which was selected by the hide monochrome attribute. Block 6-10E selects hexadecimal 66 (0110 0110) from the color/attribute table of FIG. 4B. Yellow is combination of red and green.

If the P3 bit corresponding to the hide monochrome attribute is at binary ONE in decision block 6-12E, then decision block 6-13E tests if the selected attribute from block 6-8E is the hide color attribute. If the hide color attribute was not selected, then block 6-14E stores hexadecimal 66 in the appropriate color display location. If the selected color attribute was hide, then the P4 bit corresponding to the inverse monochrome attribute bit I is tested in decision block 6-11E. If the P4 bit is at binary ONE, then block 6-14E stores hexadecimal 66 in the color display locations, otherwise block 6-15E stores hexadecimal 00 in those locations of FIG. 6E, since hide is the selected attribute.

Figure 6E:
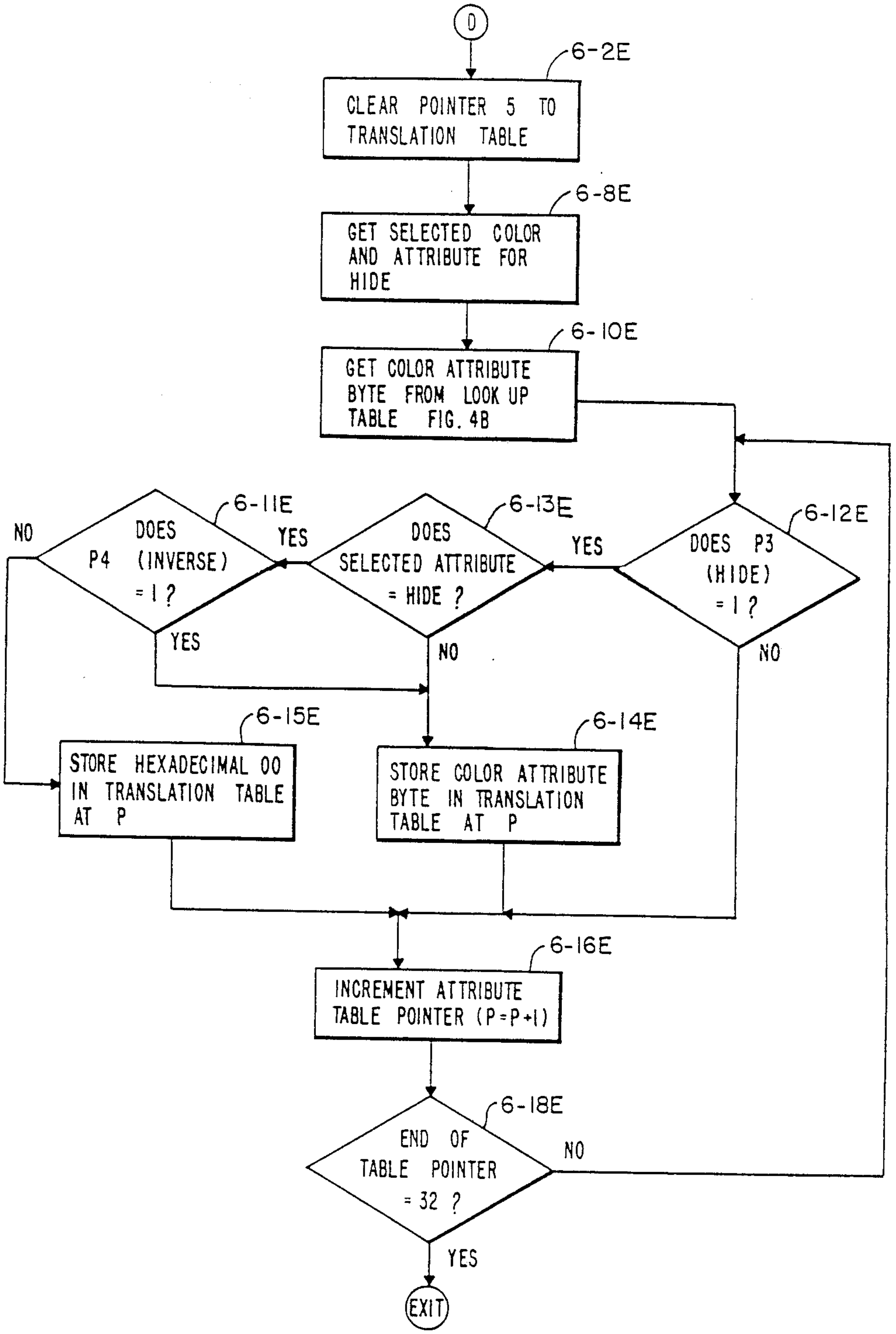

Block 6-16E increments the contents of pointer 5 and decision block 6-18E causes an exit to the next routine after 32 cycles of the blocks of FIG. 6E.

Note the manner in which the priorities are established. Subsequent monochrome attributes have higher priority than all preceeding monochrome attributes by writing the values obtained from the color/attribute matrix of FIG. 4B over previously stored color display values. Note that blocks 6-11A and 6-11B are not required if the "NO" branch is taken. In using the priority scheme, the inverse monochrome attribute will override the YES branch. Blocks 6-11A and 6-11B are included for consistency with the software logic.

Figure 7:
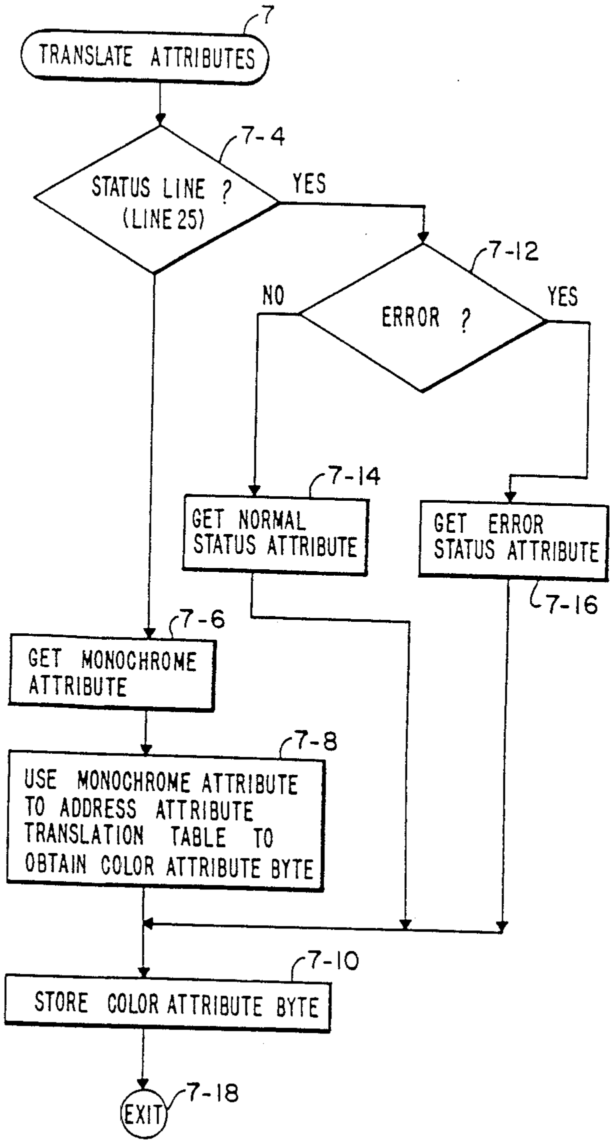
FIG. 7 shows a flow diagram of the use of the attribute translation table.

FIG. 7 shows the use of the attribute translation table 4-28 by a Translate Attributes routine 7.

Decision block 7-4 tests whether this is the status line, that is, line 25 of a 25 line display on video color display 4-4.

If this is the last line, then decision block 7-12 tests if there was an error in the system. If there was an error, then block 7-16 gets the red status attribute from FIG. 3. If there was no error, then block 7-14 gets the yellow status attribute from FIG. 3.

If one of the first 24 lines is being displayed, then block 7-6 gets the monochrome attribute from data and monochrome attribute storage 4-27.

Block 7-8 uses the attribute translation table of FIG. 5F to select the color attribute for display. Note that normal text has a color display attribute value of hexadecimal 09 since no monochrome attribute bits appear. This results in the high intensity blue character foreground display on a black background.

From the table of FIG. 5F, the low intensity monochrome attribute A, hexadecimal 01, selects a color display attribute of hexadecimal 02, which displays a green low intensity foreground color on a black background. The underline monochrome attribute B, hexadecimal 10 selects a color display attribute of hexadecimal 0B which displays a cyan high intensity foreground color on a black background. The inverse monochrome attribute C, hexadecimal 08, selects a color display attribute of hexadecimal 40 which displays a black character on a red background. The blink inverse monochrome attribute, hexadecimal 02, selects a color display attribute of hexadecimal 8D which gives a high intensity blinking magenta character on a black background. The hide monochrome attribute E, hexadecimal 04, selects a screen attribute of hexadecimal 00 which displays a black background and foreground.

The monochrome attribute, may have a number of attribute bits. As an example, underline blinking monochrome attribute F, hexadecimal 12, results in a color display attribute of hexadecimal 8D which displays a blinking high intensity magenta character on a black background Block 7-10 stores the color display attribute in the attribute RAM 4-22A for transfer to attribute display logic 4-23. The output is applied to color selection logic 4-26 which determines the characteristics of the characters received from the shift register in accordance with the color display attribute bytes receives from the attribute display logic 4-23 for display on video color display 4-4.

While the invention has been shown and described with reference to the preferred embodiment thereof, it will be understood by those skilled in the art that the above and other changes in form and detail may be made therein without departing from the spirit and scope of the invention.

What is claimed is:

1. A method of translating monochrome attributes to colors and color attributes for display on a color screen, said method comprising the steps of:

A. displaying a menu including a plurality of monochrome attributes, a plurality of colors for each of said plurality of monochrome attributes, and a plurality of color attributes for each of said plurality of monochrome attributes;

B. associating from said menu one of said plurality of colors and one of said plurality of color attributes in combination with each of said plurality of monochrome attributes;

C. generating a color attribute matrix in the memory having a plurality of color attribute bytes, one color attribute byte representative of each combination of color and color attribute;

D. initializing a pointer stored in said memory, said pointer pointing to the first location of a translation table stored in said memory;

E. getting a certain color attribute byte selected by indexing said color attribute matrix using a first color and first color attribute selected by said menu for the first of said plurality of monochrome attributes;

F. testing if a first bit of said pointer equals binary ONE, said first bit corresponding to a first bit of a certain monochrome attribute byte;

G. storing said certain color attribute byte in said translation table at a location specified by contents of said pointer if said first bit is binary ONE and incrementing said pointer, or incrementing said pointer if said first bit is not binary ONE;

H. testing if the contents of said pointer equal decimal 32; and

I. repeating steps F through I if the contents of said pointer do not equal 32 and repeating steps D through I when the contents of said pointer equals decimal 32 for each subsequent monochrome attribute.

2. The method of claim 1 further comprising the steps of:

A. getting from said memory a monochrome attribute byte representative of one of said plurality of monochrome attributes;

B. addressing said translation table by said monochrome attribute byte and reading out said color attribute byte;

C. storing said color attribute byte in an attribute table in said memory; and

D. reading out said color attribute byte from said attribute table for display with a text character read from a data memory.

3. The method of claim 1 wherein the order in which said plurality of monochrome attributes are used to generate said translation table establishes the relative priority of said each of said plurality of monochrome attributes for displaying the color of the highest priority monochrome attribute when said monochrome attribute byte includes a number of monochrome attributes.

4. A method of translating monochrome attributes to color attributes for display on a color screen, said method comprising the steps of:

A. displaying a menu including a plurality of monochrome attributes, a plurality of colors for each of said plurality of monochrome attributes and a plurality of color attributes for each of said plurality of monochrome attributes;

B. selecting one of said plurality of colors and one of said plurality of color attributes for each of said plurality of monochrome attributes from said menu;

C. generating a color attribute matrix in a memory having a color attribute byte representative of said selected color and said selected color attribute;

D. initializing a pointer stored in said memory, said pointer pointing to a memory location in a translation table;

E. getting a first color attribute byte selected from indexing said color attribute matrix using a first color and a first color attribute selected by said menu for the first of said plurality of monochrome attributes;

F. testing a first bit of said pointer;

G. testing if said first color attribute byte is a predetermined color attribute if said first bit is at binary ONE;

H. testing a second bit of said pointer, if said first color attribute byte is said predetermined color attribute;

I. storing a predetermined number in said translation table at a location specified by the contents of said pointer if said second bit is not equal to binary ONE and said first color attribute byte is said predetermined color attribute, storing said predetermined color attribute at said location in said translation table if said second bit is equal to binary ONE and storing said first color attribute byte at said location if said first bit is at binary ONE and said first color attribute is not said predetermined attribute;

J. incrementing said pointer;

K. testing said pointer for decimal 32 and if the contents of said pointer is not decimal 32, repeating steps D through K; and if the contents of said pointer is decimal 32, then L. repeating steps D through L for a second color attribute byte selected by a second monochrome attribute, a third color attribute byte selected by a third monochrome attribute, and a fourth color attribute byte selected by a fourth monochrome attribute, testing a third bit, a fourth bit and a fifth bit for said second color attribute byte, said third color attribute byte and said fourth color attribute byte respectively;

M. repeating steps D, E and F for a fifth color attribute byte selected by a fifth monochrome attribute;

N. testing said second bit for binary ONE and storing said fifth color attribute byte in said location of said translation table if said second bit is at binary ONE;

O. incrementing said pointer; and

P. testing said pointer for decimal 32 and repeating steps M, N and O until said pointer stores decimal 32.

5. The method of claim 4 wherein said first monochrome attribute represents a low intensity monochrome attribute and said first bit is the first least significant bit.

6. The method of claim 4 wherein said predetermined color attribute byte represents a hide color attribute byte and said second bit is the fourth least significant bit.

7. The method of claim 4 wherein said second monochrome attribute represents an underline monochrome attribute, said third monochrome attribute represent a blink monochrome attribute byte, said third bit is the fifth least significant bit and said fourth bit is the second least significant bit.

8. The method of claim 4 wherein said fourth monochrome attribute represent a hide monochrome attribute, said fifth monochrome attribute byte represents an inverse monochrome attribute and said fifth bit is the third least significant bit.

9. A method of translating monochrome attributes to color attributes for display on a color screen, said method comprising the steps of:

A. selecting one of a plurality of colors and one of a plurality of color attributes for each of said plurality of monochrome attributes;

B. generating a color attribute matrix in a memory having a color attribute character code representative of said selected color and said selected color attribute;

C. initializing a pointer stored in said memory, said pointer pointing to a memory location in a translation table;

D. getting a first color attribute character code selected from indexing said matrix using a first color and a first color attribute selected by said menu for the first of said plurality of monochrome attributes;

E. testing if a first bit of said pointer is in a first state, said first bit corresponding to a first bit of a first monochrome attribute character;

F. storing said first color attribute character in said translation table at a location specified by the contents of said pointer if said first bit is in said first state and incrementing said pointer, or incrementing said pointer if said first bit is in a second state;

G. testing if the contents of said pointer equals a predetermined number; and

H. repeating step E through H if the contents of said pointer do not equal said predetermined number and repeating steps C through H when the contents of said pointer equals said predetermined number for each subsequent monochrome attribute.

10. The method of claim 1 further comprising the steps of:

A. getting a monochrome attribute character code from said memory;

B. addressing said translation table by said monochrome attribute character code and reading out said color attribute character code;

C. storing said color attribute character code in an attribute table in said memory; and D. reading out said color attribute character code from said attribute table for display with a text character read from a data memory.

11. The method of claim 1 wherein the order in which said plurality of monochrome attributes are used to generate said translation table establishes the relative priority of said each of said plurality of monochrome attributes for displaying the color of the highest priority monochrome attribute when said monochrome attribute character code includes a number of monochrome attributes.

12. A method of translating monochrome attributes to color attributes for display on a color screen, said method comprising the steps of:

A. selecting one of a plurality of colors and one of a plurality of color attributes for each of said plurality of monochrome attributes;

B. generating a color attribute matrix in a memory having a color attribute character code representative of said selected color and said selected color attribute;

C. initializing a pointer stored in said memory, said pointer pointing to a memory location in a translation table;

D. getting a first color attribute character code selected from indexing said matrix using a first color and a first color attribute selected by said menu for the first of said plurality of monochrome attributes;

E. testing a first bit of said pointer;

F. testing if said first color attribute byte is a predetermined color attribute if said first bit is in a first state;

G. testing a second bit of said pointer, if said first color attribute character code represent said predetermined color attribute;

H. storing a predetermined number in said translation table at a location specified by the contents of said pointer if said second bit is in a second state and said first color attribute byte is said predetermined color attribute, storing said predetermined color attribute at said location in said translation table if said second bit is in a first state and storing said first color attribute byte at said location if said first bit is in a said first state and said first color attribute is not said predetermined attribute;

I. incrementing said pointer;

J. testing said pointer for a predetermined number and if the contents of said pointer is not said predetermined number, repeating steps C through J; and if the contents of said pointer is said predetermined number, then K. repeating steps B through J for a second color attribute character code selected by a second monochrome attribute, a third color attribute selected by a third monochrome attribute, and a fourth color attribute character code selected by a fourth monochrome attribute, testing a third bit, a fourth bit and a fifth bit for said second color attribute character code, said third color attribute character code and said fourth color attribute character code respectively;

L. repeating steps C, D and E for a fifth color attribute character selected by a fifth monochrome attribute;

M. testing if said second bit is in a first state and storing said fifth color attribute character code in said location of said translation table if said second bit is in said first state;

N. incrementing said pointer; and

O. testing said pointer for said predetermined number and repeating steps L, M and N until said pointer stores said predetermined number.

13. The method of claim 12 wherein said first monochrome attribute represents a low intensity monochrome attribute and said first bit is the first least significant bit.

14. The method of claim 12 wherein said predetermined color attribute byte represents a hide color attribute byte and said second bit is the $2^3$ bit.

15. The method of claim 12 wherein said second monochrome attribute represents an underline monochrome attribute, said third monochrome attribute represents a blink monochrome attribute character code, said third bit is the fifth least significant bit and said fourth bit is the second least significant bit.

16. The method of claim 12 wherein said fourth monochrome attribute represents a hide monochrome attribute, said fifth monochrome attribute character code represents an inverse monochrome attribute and said fifth bit is the third least significant bit.

* * * * *